United States Patent
Narayanan et al.

(10) Patent No.: US 6,680,139 B2
(45) Date of Patent: Jan. 20, 2004

(54) REDUCED SIZE FUEL CELL FOR PORTABLE APPLICATIONS

(75) Inventors: Sekharipuram R. Narayanan, Arcadia, CA (US); Thomas I. Valdez, Covina, CA (US); Filiberto Clara, Prosser, WA (US); Harvey A. Frank, Encino, CA (US)

(73) Assignee: California Institute of Technology, Pasadena, CA (US)

( * ) Notice: Subject to any disclaimer, the term of this patent is extended or adjusted under 35 U.S.C. 154(b) by 254 days.

(21) Appl. No.: 09/681,833

(22) Filed: Jun. 13, 2001

(65) Prior Publication Data

US 2001/0051293 A1 Dec. 13, 2001

Related U.S. Application Data

(60) Provisional application No. 60/211,444, filed on Jun. 13, 2000.

(51) Int. Cl.$^7$ ................................................ H01M 2/00
(52) U.S. Cl. ............................ 429/34; 429/32; 429/38; 429/39
(58) Field of Search .............................. 429/32, 34, 38, 429/39

(56) References Cited

U.S. PATENT DOCUMENTS

| | | | | |
|---|---|---|---|---|
| 5,432,023 A | | 7/1995 | Yamada et al. | 429/34 |
| 5,709,961 A | * | 1/1998 | Cisar et al. | 429/32 |
| 5,863,672 A | * | 1/1999 | Ledjeff et al. | 429/26 |
| 5,925,477 A | * | 7/1999 | Ledjeff et al. | 429/32 |
| 5,952,118 A | * | 9/1999 | Ledjeff et al. | 429/32 |
| 6,054,228 A | | 4/2000 | Cisar et al. | 429/18 |
| 6,214,485 B1 | * | 4/2001 | Barnett et al. | 429/13 |
| 6,479,178 B2 | * | 11/2002 | Barnett | 429/32 |

* cited by examiner

Primary Examiner—Bruce F. Bell
(74) Attorney, Agent, or Firm—Fish & Richardson P.C.

(57) ABSTRACT

A flat pack type fuel cell includes a plurality of membrane electrode assemblies. Each membrane electrode assembly is formed of an anode, an electrolyte, and an cathode with appropriate catalysts thereon. The anode is directly into contact with fuel via a wicking element. The fuel reservoir may extend along the same axis as the membrane electrode assemblies, so that fuel can be applied to each of the anodes. Each of the fuel cell elements is interconnected together to provide the voltage outputs in series.

10 Claims, 2 Drawing Sheets

REDUCED SIZE FUEL CELL FOR PORTABLE APPLICATIONS

CROSS REFERENCE TO RELATED APPLICATIONS

The present application claims priority from provisional application No. 60/211,444, filed Jun. 13, 2000.

FEDERAL RESEARCH STATEMENT

The invention described herein was made in the performance of work under a NASA contract, and is subject to the provisions of Public Law 96-517(35 USC 202) in which the contractor has elected to retain title.

BACKGROUND OF INVENTION

Many applications exist for small power sources. For example, such devices have been used to power portable computers, cell phones, and the like. Conventional type sources may include rechargeable batteries. The current state-of-the-art is lithium ion batteries. These batteries have an energy content of approximately 150 watt-hours/kg. Once the energy content is exhausted, the user must recharge the battery. This means that users must either wait while the battery is recharged, or carry additional batteries, recharging equipment, and the like. The recharging can also only be carried out when the user is in proximity to a power outlet.

Fuel cells are known in the art as devices which produce electricity when provided with fuel.

However, conventional fuel cells include bipolar plate stacks, pumps, blowers, and other devices which may add considerable complexity to the final device.

SUMMARY OF INVENTION

The present application teaches a fuel cell apparatus which has a structure that is highly suitable for miniaturization. In one aspect, the apparatus has a structure that brings fuel into contact with specified parts of the fuel cell. A wicking structure may be used to bring the fuel into contact with the fuel cell element.

BRIEF DESCRIPTION OF DRAWINGS

These and other aspects will now be described in detail with reference to the accompanying drawings, wherein:

FIG. 1A shows a front on view of a flat pack fuel cell of an embodiment;

FIG. 1B shows an cross sectional edge view of a first embodiment of the fuel cell system along the line 1b—1b in FIG. 1a;

DETAILED DESCRIPTION

Figures 1A, 1B:
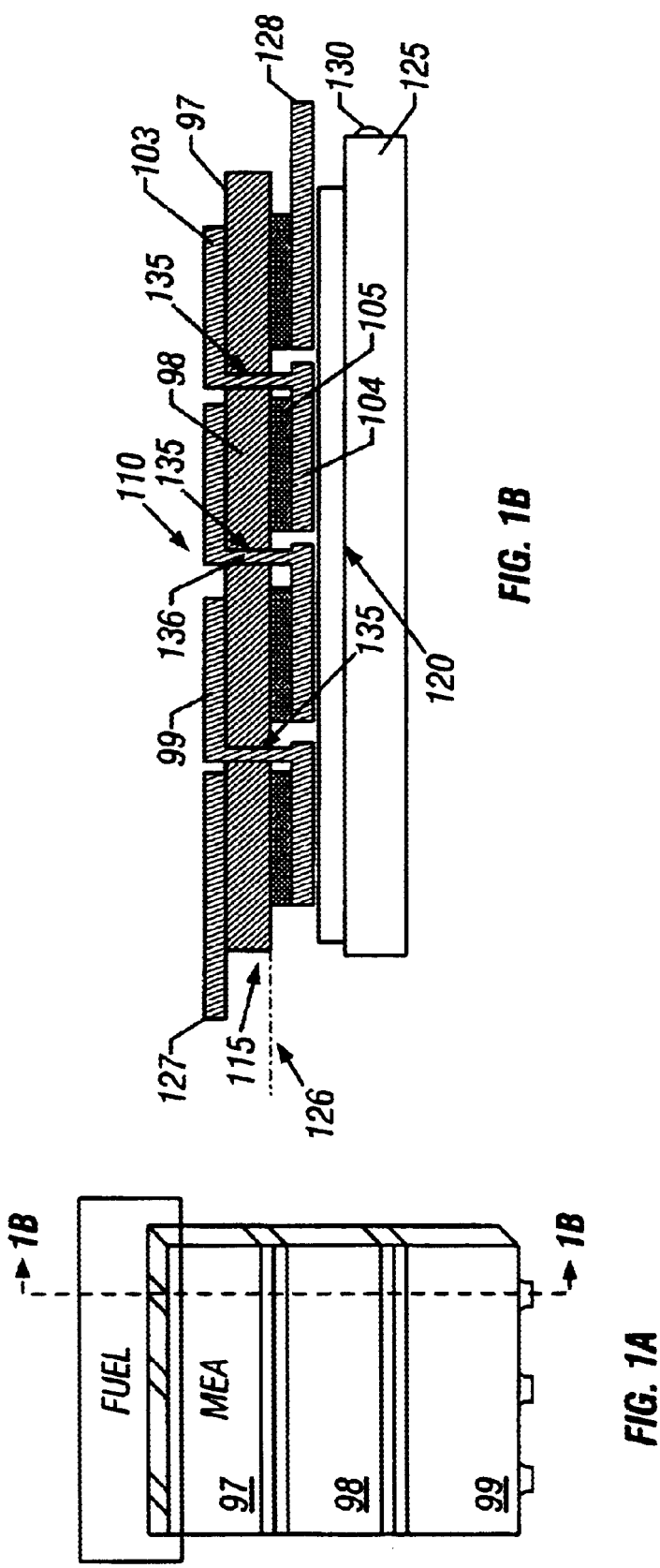

The FIGS. 1A and 1B embodiment show an edge view of the miniaturized, flatpack type fuel cell. Electrical energy is generated by oxidation of organic fuel and reduction of oxygen in air to water. Any of a number of different kinds of fuel cells may be used. One type is the fuel cell described in U.S. Pat. No. 5,599,638.

The flatpack fuel cell may include a plurality of cells interconnected both in series and in parallel. FIG. 1A shows a front view of the fuel cell assembly, with plural membrane electrode assemblies 97, 98, and 99. FIG. 1B shows a cross section along the line 1b—1b, which shows the MEAs 97, 98, 99.

Each of the membrane electrode assemblies such as 97 includes an anode 105 and a cathode 110. The anode 105 and cathode 110 are separated by a polymer electrolyte membrane 115. A polymer electrolyte membrane may be, for example, of the type described in U.S. Pat. No. 6,150,047 and 6,136,463. In this embodiment, all of the cells such as 97, 98, 99 are arranged along an axis 126, in a single contiguous plane.

As shown in FIG. 1b, the fuel cell elements are effectively connected in series. The cathode 103 of fuel cell element 97 is connected via the interconnects 135 to the anode 104 of the next fuel cell element 98. Similarly, each cathode is connected in series to the next anode. This provides the fuel cell elements being in series, providing outputs at the final electrodes 127, 128, that correspond to a series combination of all of the voltages.

The anode is in contact with a wicking structure 120 which also extends along that axis, substantially parallel to the anodes. The wicking structure 120 itself is in contact with the fuel source 125, which may also include a refillable fuel reservoir 130.

The wicking structure can be made of any absorbent material, such as an absorbent pad, or any other absorbent material that is chemically stable in contact with the fuel and also electrochemically stable in contact with the anode. In fact, any structure that can provide the liquid fuel via capillary action can be used for this purpose. The fuel source and fuel reservoir may hold the fuel that drives the electrochemical reaction. The fuel may be absorbed by the wicking structure, and provided to the anode.

Wicking structure 120 absorbs the fuel, and provides the fuel to the anodes. The wicking structure may deliver the fuel in regulated amounts to the surfaces of the anodes. A plurality of cathodes 110 are each in contact with air, for the oxygen used in the electrochemical reaction.

The cells create a voltage by the electrochemical reaction. This voltage is produced between the top current collector 127 and the bottom current collector 128.

Figure 2:
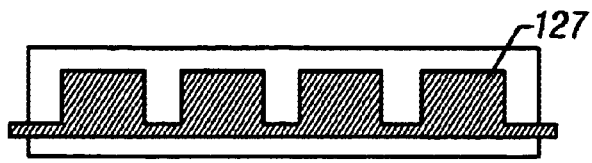
FIG. 2 shows a top view of the first embodiment.

A top view of the cell is shown in FIG. 2. This also shows the electrode/current collector 127, and the corresponding electrodes of the other cells 97, 98, 99.

Conventional fuel cells have often used "biplates" which may add weight, volume, complexity and cost to the fuel cell. These biplates are not used in the flatpack cell. Instead, the cells are connected using interconnects 135, 136, that connect to and/or extend through part of the membrane. These interconnects may be made from corrosion resistant conductive materials. Example materials which can form a through-membrane connectors include graphite, platinum, gold, and appropriate stable polymer blinders such as PVDF or Nafion.

Figure 3:
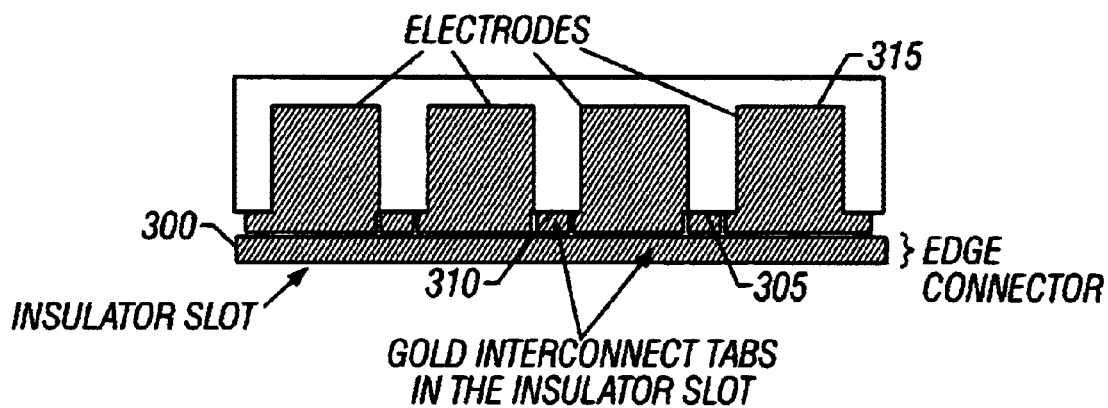
FIG. 3 shows a top view of an alternative embodiment.

A second embodiment, formed in FIG. 3, uses an edge connector instead of the through-membrane connectors. The edge and connector configuration is formed of a thin strip of conductive material. An insulator slot 300 is formed, and the interconnects 305, 310 are formed in tabs in the insulator slot. These interconnects are connected between the electrodes 315. The interconnect tabs may be formed of gold or graphite, for example.

The membrane electrode assemblies may be formed in the conventional way. The anodes in FIG. 1 may first be fabricated by applying catalyst layers and backing structures. The membrane is applied to the anode, and the catalyst layer and cathode are fitted together. The catalyst may be applied, for example, using catalyst inks or catalyst-precoated membranes, or may be applied using a sputter deposition process. Gas diffusion backing layers may also be bonded to the membrane using a hot pressing process. An example is described in U.S. Pat. No. 5,599,638; and 6,171,721.

An alternative, non-bonded backing layers can be used to form the membrane electrode assemblies. Other alternatives may include preparation of such assemblies by reactive sputter deposition of metal catalyst layers, spray deposition, chemical vapor deposition, electrodeposition, ion impregnation, in situ catalyst deposition from organic metal precursor and combustion chemical vapor deposition.

A platinum-ruthenium catalyst may be used at the anode. The cathode may use a pure platinum catalyst, for example. However, other catalysts may be used which involve binary and turnery compositions of Pt, Ru, Ti, Zr, Ir and Os, especially on the anode.

The anode structure may be made hydrophilic, so that liquid organic fuel may be absorbed through the anode. The wicking structure 120 brings the fuel into contact with the anode 105, allowing the liquid organic fuel to access the catalyst layer, and to allow carbon dioxide product to readily leave the surface. The cathode may be rendered hydrophobic, in order to prevent water from saturating the electrode. This also provides air more ready access to the catalyst layer.

Two of the basic building blocks shown in FIGS. 1–3 may be combined in series or in parallel to increase the voltages. For example, a three cell flatpack may be capable of producing a terminal voltage in the range of 11.2 V depending on the load that is placed on the voltage. However, multiple ones of these arrays may be used to obtain higher voltages.

Figure 4:
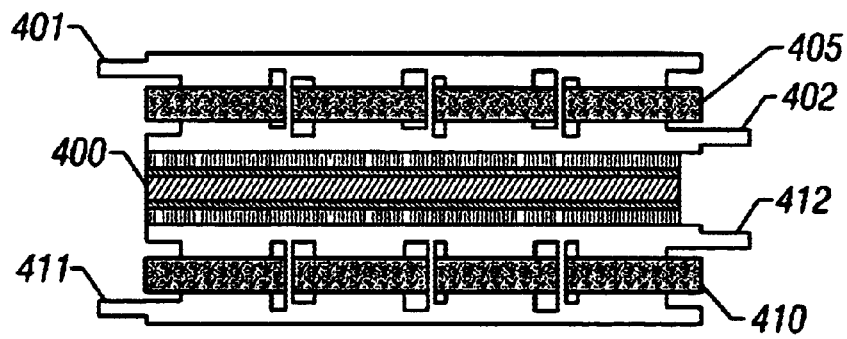
FIG. 4 shows an embodiment with multiple flat pack elements electrically connected together.

FIG. 4 shows two sets of flat pack fuel cells 405, 410 arranged with a common fuel feed 400, e.g., a methanol feed, arranged between the two fuel cells. The two flatpacks each have respective outputs. The fuel cell element 405 has output terminals 401, 402. Similarly, the fuel cell element 410 includes the outputs 411, 412. These output terminals may be connected may be electrically connected in series to increase the voltage output. For example, terminal 402 could be connected to terminal 411, with outputs being obtained between terminals 401 and 12. Alternatively, the fuel cells could be connected in parallel to increase the current handling capability.

The device may be made and tested in an enclosure with an internal absorbent pad on the anode side that retains the methanol solution. The fuel is delivered to the anode via capillary action. The other end of the housing has multiple air openings allowing air access. However, other housings may be similarly used.

Although only a few embodiments have been disclosed in detail above, other embodiments are possible. All such modifications are intended to be encompassed within the following claims, in which:

What is claimed is:

1. A fuel cell, comprising:
   a plurality of fuel cell elements, including electrical connection parts that include an anode and a cathode, said plurality of fuel cell elements extending along an extended axis;
   a fuel reservoir, extending along said extended axis; and
   a fuel delivery element, extending between said fuel reservoir and said anodes of all of said fuel cell elements, and supplying fuel to all of said anodes extending along said extended axis;
   wherein said fuel delivery element includes a wicking structure that provides fuel from said fuel reservoir to said anodes via capillary action.

2. A fuel cell as in claim 1, wherein said fuel reservoir extends along an entirety of said extended axis, from one end of said one electrical connection parts to the other end of said one electrical connection parts.

3. A fuel cell as in claim 2, wherein said anode is rendered hydrophilic, to allow liquid fuel to be more readily absorbed thereby.

4. A fuel cell as in claim 3, wherein said cathodes, are located on an opposite side of said plurality of fuel cell elements from said anode, and said said cathodes are rendered hydrophobic.

5. A fuel cell as in claim 4, further comprising a housing, said housing including air holes in a vicinity of said cathode.

6. A fuel cell, comprising:
   a plurality of fuel cell elements, including electrical connection parts that include an anode and a cathode, said plurality of fuel cell elements extending along an extended axis;
   a fuel reservoir, extending along said extended axis;
   a fuel delivery element, extending between said fuel reservoir and said anodes of all of said fuel cell elements, and supplying fuel to all of said anodes extending along said extended axis; and
   a plurality of interconnections between said fuel cell elements, said plurality of interconnections including electrical interconnections; and
   wherein said interconnections include a connector plate connecting between portions of said electrodes.

7. A fuel cell, comprising:
   a plurality of fuel cell elements, including electrical connection parts that include an anode and a cathode, said plurality of fuel cell elements extending along an extended axis;
   a fuel reservoir, extending along said extended axis; and
   a fuel delivery element, extending between said fuel reservoir and said anodes of all of said fuel cell elements, and supplying fuel to all of said anodes extending along said extended axis;
   a second plurality of fuel cell elements, formed along a second extended axis parallel from but spaced from said extended axis, and also in connection with said fuel reservoir; and
   wherein said fuel delivery element includes a first wicking structure which extends between said fuel reservoir and anodes of said plurality of fuel cell elements, and a second wicking structure extending between second plurality of fuel cell elements and anodes of the second plurality of fuel cell elements, wherein said first and second wicking structures are each in contact with single fuel reservoir.

8. A method, comprising:
   providing a plurality of fuel cell elements along an extended axis, each of said fuel cell elements including an anode, an electrolyte membrane, and a cathode;
   providing fuel from a fuel reservoir to each of said cathodes of each of said fuel cell elements directly, via capillary action; and
   rendering the anode hydrophilic, to facilitate fuel absorption into the anode.

9. A method, comprising:
   providing a plurality of fuel cell elements along an extended axis, each of said fuel cell elements including an anode, an electrolyte membrane, and a cathode;

providing fuel from a fuel reservoir to each of said cathodes of each of said fuel cell elements directly, via capillary action; and rendering the cathode hydrophobic, to prevent fuel front absorbing into the anode.

10. A method as in claim 9, further comprising rendering the cathode hydrophobic, to prevent fuel from absorbing into the cathode.

* * * * *